United States Patent [19]

Sedlaczek et al.

[11] 4,240,667
[45] Dec. 23, 1980

[54] DRIVING GEAR RACK CLEANER FOR A MINING MACHINE

[75] Inventors: Janusz Sedlaczek, Gliwice; Andrzej Błażewicz, Tychy; Marian Krutki, Katowice; Kazimierz Mandat, Katowice; Tadeusz Wozniak, Katowice, all of Poland

[73] Assignee: Centralny Osrodek Projektowokonstrukcyjyn Maszyn Gorniczych "Komag", Gliwice, Poland

[21] Appl. No.: 11,883

[22] Filed: Feb. 13, 1979

[30] Foreign Application Priority Data

Feb. 22, 1978 [PL] Poland .................................. 204864

[51] Int. Cl.³ .............................................. E21C 29/24
[52] U.S. Cl. ...................................... 299/43; 104/279; 105/29 R
[58] Field of Search .................. 299/32, 34, 42, 43; 105/29 R; 74/842, 468; 104/244.1, 279, 280

[56] References Cited

U.S. PATENT DOCUMENTS

| 386,184 | 7/1888 | Cheesebrough | 105/29 R |
|---|---|---|---|
| 449,855 | 4/1891 | King | 104/279 |
| 3,305,952 | 2/1967 | Dressler | 104/279 X |
| 4,006,937 | 2/1977 | Curtis | 105/29 R X |

FOREIGN PATENT DOCUMENTS 93531 12/1977 Poland .

OTHER PUBLICATIONS

"Longwall Haulage Systems—Progress in America", Mining Congress Journal, 10/78 pp. 30-34.

Primary Examiner—Ernest R. Purser
Attorney, Agent, or Firm—Haseltine, Lake & Waters

[57] ABSTRACT

A driving gear for a mining machine comprising a coil chain wound over a driving wheel and a jockey wheel and co-operating with a rack mounted along a conveyor. A sweep-off gear is pivotably mounted in front of a slide of the machine at a level above the rack. The sweep-off gear has a sweep-off surface which is inclined both with respect to the longitudinal axis of the rack and the horizontal surface of the rack teeth for sweeping-off bodies from the rack onto the conveyor. Nozzles are provided on the gear for washing the rack with a water stream under pressure at an angle with respect to the surface of the rack.

4 Claims, 2 Drawing Figures

DRIVING GEAR RACK CLEANER FOR A MINING MACHINE

FIELD OF THE INVENTION

This invention relates to a driving gear for a mining machine, especially for a mechanical miner travelling along a conveyor.

PRIOR ART

A driving gear for a mining machine, especially for a mechanical miner travelling along a longwall conveyor is known from the Polish Patent Application No. P.177758. Said gear is mounted into the mechanical miner and consists of a driving chain wheel, a jockey chain wheel, and guide chain wheels. Said wheels are mounted on the mechanical miner. Around said wheels an endless coil chain is wrapped, one section of whcih is disposed parallel to the conveyor and is supported in position by means of a deflecting block or sliding runner. The section of the chain, supported by the deflecting block comes in mesh with a rack disposed along the conveyor on one of its shelves. The rack teeth have a shape suitable for co-operation with the coil chain. Also the driving, jockey, and guide chain wheels are toothed wheels with teeth suitable for co-operation with the coil chain. The driving chain wheel driven by the motor of the mechanical miner rotates thus causing overwinding of the coil chain over the jockey and guide chain wheels, and the chain section co-operating with the rack forces the travel of the mechanical miner in similar manner as for a track vehicle.

In the course of operation of the machine splinters of mined coal fall down onto the rack, thus causing disturbances in co-operation of the coil chain with the rack. The known driving gear is provided with sweep-out for removing the coal splinters from the rack. The sweep-out gears are rigidly attached to the body of the mechanical miner and have the form of flat triangular plates disposed between the rows of the rack teeth. Said plates are disposed with their bases parallel to the rack, and being shifted together with the mechanical miner they sweep with their nibs the coal splinters out from the furrow between the teeth.

A disadvantage of the known driving gear is the ineffectiveness of operation of the sweep-out gears, which remove the impurities from the furrow between the teeth but leave fine rock splitters in tooth spaces. First of all, the sweep-out gears do not prevent the larger blocks falling down onto the rack from penetrating between the mechanical miner body and the rack, where they are crushed and flow onto the rack.

SUMMARY OF THE INVENTION

An object of the invention is to provide a driving gear for a mining machine, which has the ability of cleaning the rack of rock splinters.

This object is achieved in a driving gear containing a coil chain winding over and between the driving and the jockey chain wheel, and co-operating with a rack mounted along the conveyor, said driving gear being provided in front of the mechanical miner with a sweep-off gear removing the blocks of winning, and with water nozzles washing with a water stream the fines and dusts from the rack. The sweep-off gear is mounted on the body by means of a pin, whereby its sweeping-off plane is disposed askew to the rack surface, whereby the rock blocks falling down onto the rack are swept off onto the conveyor. Furthermore, the sweep-off gear is provided with a console abutting against the body whereby the forces acting onto the sweep-off gear are transferred to the body.

BRIEF DESCRIPTION OF THE DRAWING

An exemplary embodiment is shown in the accompanying drawing wherein.

DETAILED DESCRIPTION

Figure 1:
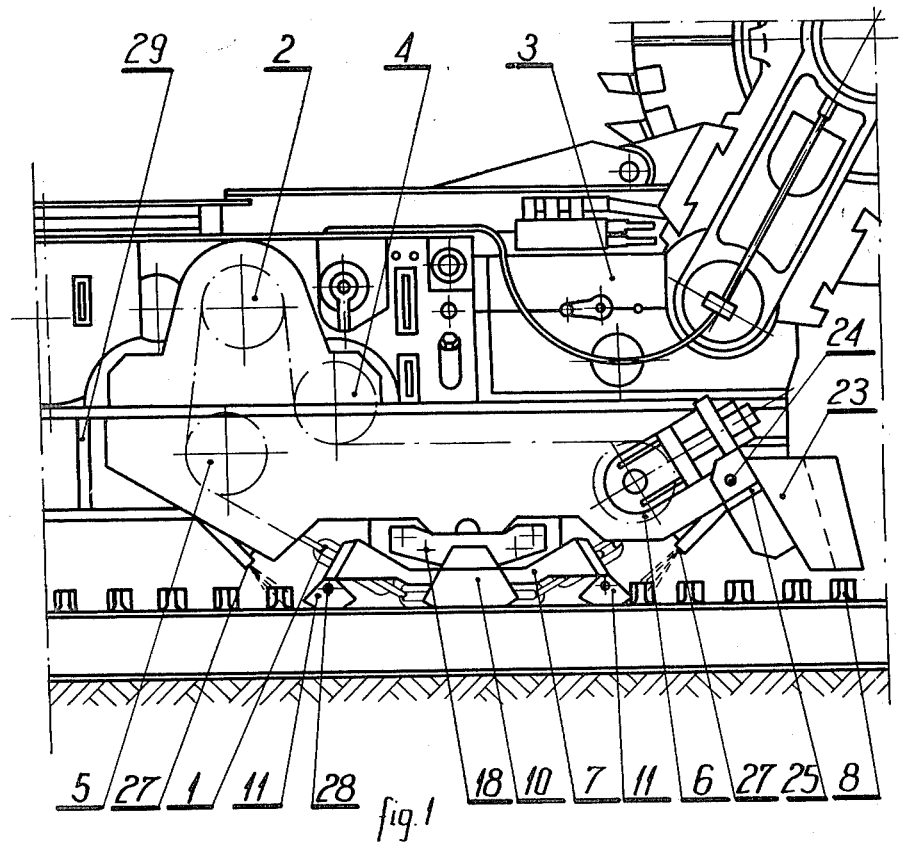
FIG. 1 is a fragmentary side view of the mechanical miner.

The driving gear for a mining machine, as shown in FIG. 1, is provided with the driving system comprising chain 1, composed of the driving chain wheel 2, the mechanical miner body 3, the jockey chain wheel 4 mounted on the mechanical miner body, and the idle guide chain wheel 5 and the shiftable idle guide chain wheel 6, mounted on the body 3 of the mechanical miner. The travel drive system is provided with a sliding runner 7 forcing the chain 1 into mesh with the rack 8. Fitted on the sliding runner 7 is a tubular slipper 10, and sweep-out gears 11 are mounted with limited movability on pins 28, which when travelling together with the mechanical miner remove with their nibs coal splinters from the furrow between the teeth of the rack 8. The flexible mounting of the sweep-out gears 11 on pins 28 facilitates passage of the sweep-out gears from one segment of the rack onto a subsequent segment, as they can not be in flush with each other.

The driving gear according to the invention is provided with nozzles 27 directing a water stream askew to the surface of the rack 8, under pressure, thus causing the removal of fines and dust from the rack 8.

Figure 2:
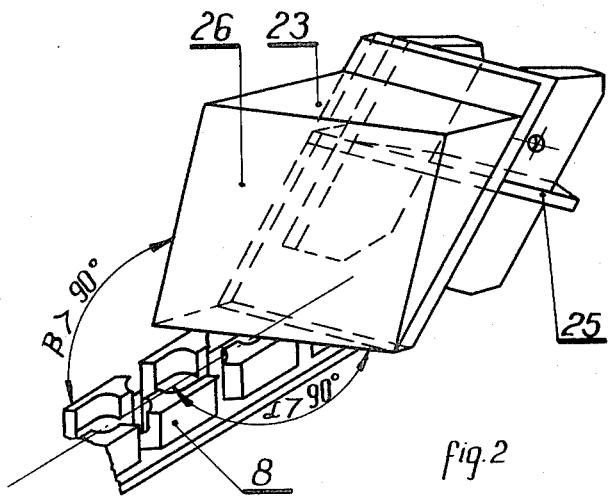
FIG. 2 is a perspective view of the sweep-off gear and a portion of the rack.

The seep off gear 23 is mounted on front of the mechanical miner slide 29 by means of at least one pin 24 as, shown in FIG. 2. The edges of the loading surface 26 of the sweep-off gear 23 form with the longitudinal axis of the rack 8 angles $\alpha$ and $\beta$ exceeding 90°, whereby the rock blocks are swept off onto the conveyor. The sweep-off gear 23 is provided with a console 25 abutting against the lower surface of the mechanical miner slide 29, thus transferring the forces caused by sweeping off the impurities from the rack 8.

What is claimed is:

1. A driving gear for a mining machine having a body and comprising a coil chain wound over a driving chain wheel and a jockey chain wheel, and co-operating with a rack mounted along the conveyor, the improvement comprising a sweep-off gear mounted on the body of the machine above the rack, said sweep-off gear having a sweeping-off surface disposed above the rack and extending transversely thereacross askew to the longitudinal axis of the rack and inclined to the surface of the rack, and a console abutting against the lower surface of the body.

2. A driving gear for a mining machine as defined in claim 1, further comprising water nozzles disposed askew to the surface of the rack.

3. A driving gear for a mining machine as defined in claim 2 comprising means pivotably mounting said sweep-off gear on said body such that said sweep-off gear can pivot freely forwardly whereas rearward pivotal movement of the sweep-off gear is limited by abutment of said console against said body.

4. A driving gear as claimed in claim 3 wherein said sweeping-off surface has an angle of inclination with respect to the longitudinal axis of the rack which is greater than 90° and an angle of inclination with respect to the surface of the rack which is also greater than 90° whereby materials on the rack are swept off onto the conveyor.

* * * * *